United States Patent
Shirley et al.

(10) Patent No.: US 7,188,011 B2
(45) Date of Patent: Mar. 6, 2007

(54) AUTOMATIC BRAKING-ENHANCED STEERING SYSTEM

(75) Inventors: Michael L. Shirley, Waterloo, IN (US); Christopher R. Pardue, Burns, TN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 33 days.

(21) Appl. No.: 11/000,877

(22) Filed: Dec. 1, 2004

(65) Prior Publication Data

US 2006/0116801 A1    Jun. 1, 2006

(51) Int. Cl.
*B62D 61/12* (2006.01)
*B62D 35/00* (2006.01)

(52) U.S. Cl. .................. 701/36; 180/197; 280/442
(58) Field of Classification Search .................. 701/36, 701/41, 70, 71; 180/197, 233, 224, 235, 180/244, 248; 280/442, 492, 98, 100
See application file for complete search history.

(56) References Cited

U.S. PATENT DOCUMENTS

| | | | |
|---|---|---|---|
| 4,712,433 A | 12/1987 | Hochstein et al. | |
| 4,798,393 A * | 1/1989 | Miura et al. | 180/409 |
| 4,881,414 A | 11/1989 | Setaka et al. | |
| 5,228,757 A * | 7/1993 | Ito et al. | 303/146 |
| 5,996,722 A * | 12/1999 | Price | 180/403 |
| 6,213,490 B1 * | 4/2001 | Lykken et al. | 280/442 |
| 6,725,734 B1 | 4/2004 | Toratani et al. | |
| 6,776,058 B1 | 8/2004 | Schroeder | |
| 6,782,967 B2 | 8/2004 | Schäfert et al. | |
| 6,857,494 B2 * | 2/2005 | Kobayashi et al. | 180/243 |
| 6,871,125 B2 * | 3/2005 | Oshima et al. | 701/22 |

* cited by examiner

*Primary Examiner*—Dalena Tran
(74) *Attorney, Agent, or Firm*—Gerald W. Askew; Jeffrey P. Calfa; Susan L. Lukasik

(57) ABSTRACT

A system for enabling a vehicle with a conventional steering system to make tighter right and left turns. The vehicle has one or more computers that monitor the steering angle and that are also capable of independently controlling a right braking unit and a left braking unit. When the computers detect that the steering angle is near the rightmost steering angle, the computers actuate the right braking unit to a greater extent than the left braking unit to allow the vehicle to make a tighter right turn. When the computers detect that the steering angle is near the leftmost steering angle, the computers actuate the left braking unit to a greater extent than the right braking unit to allow the vehicle to make a tighter left turn.

10 Claims, 4 Drawing Sheets

| STEERING ANGLE | L,48-50 | L,46-48 | L,44-46 | L,42-44 | L,40-42 | L,0-40 | R,0-40 | R,40-42 | R,42-44 | R,44-46 | R,46-48 | R,48-50 |
|---|---|---|---|---|---|---|---|---|---|---|---|---|
| DIFFERENTIAL BRAKING-DIRECTIONAL BIAS, MAGNITUDE | L,5 | L,4 | L,3 | L,2 | L,1 | 0 | 0 | R,1 | R,2 | R,3 | R,4 | R,5 |

L=LEFT
R=RIGHT

LEFTMOST STEERING ANGLE
PREDETERMINED RANGE OF STEERING ANGLES FOR LEFT-BIASED DIFFERENTIAL BRAKING
PREDETERMINED RANGE OF STEERING ANGLES FOR RIGHT-BIASED DIFFERENTIAL BRAKING
RIGHTMOST STEERING ANGLE

FIG. 3

DIFFERENTIAL BRAKING - DIRECTIONAL BIAS, MAGNITUDE

| STEERING EFFORT - DIRECTION, MAGNITUDE | STEERING ANGLE | | | |
|---|---|---|---|---|
| | L, 40-50 (PREDETERMINED RANGE OF STEERING ANGLES FOR LEFT-BIASED DIFFERENTIAL BRAKING) | L, 0-40 | R, 0-40 | R, 40-50 (PREDETERMINED RANGE OF STEERING ANGLES FOR RIGHT-BIASED DIFFERENTIAL BRAKING) |
| L, 3 | L, 6 | 0 | 0 | 0 |
| L, 2 | L, 5 | 0 | 0 | R, 1 |
| L, 1 | L, 4 | 0 | 0 | R, 2 |
| 0 | L, 3 | 0 | 0 | R, 3 |
| R, 1 | L, 2 | 0 | 0 | R, 4 |
| R, 2 | L, 1 | 0 | 0 | R, 5 |
| R, 3 | 0 | 0 | 0 | R, 6 |

L=LEFT
R=RIGHT

FIG. 4

AUTOMATIC BRAKING-ENHANCED STEERING SYSTEM

BACKGROUND OF THE INVENTION

The present invention relates to systems for enabling a vehicle to make tighter right and left turns than are enabled by the primary steering system. The invention also relates to differential application of left and right brakes to effect tighter right and left turns.

DRAWINGS

Other objects and advantages of the invention will become more apparent upon perusal of the detailed description thereof and upon inspection of the drawings in which:

FIG. 3 is an exemplary look-up table for determining an appropriate magnitude of differential braking to apply dependent upon steering angle.

FIG. 4 is an exemplary look-up table for determining an appropriate magnitude of differential braking to apply dependent upon steering angle and a direction and magnitude of effort applied to a steering-control component of the vehicle.

DETAILS OF INVENTION

Figure 1:
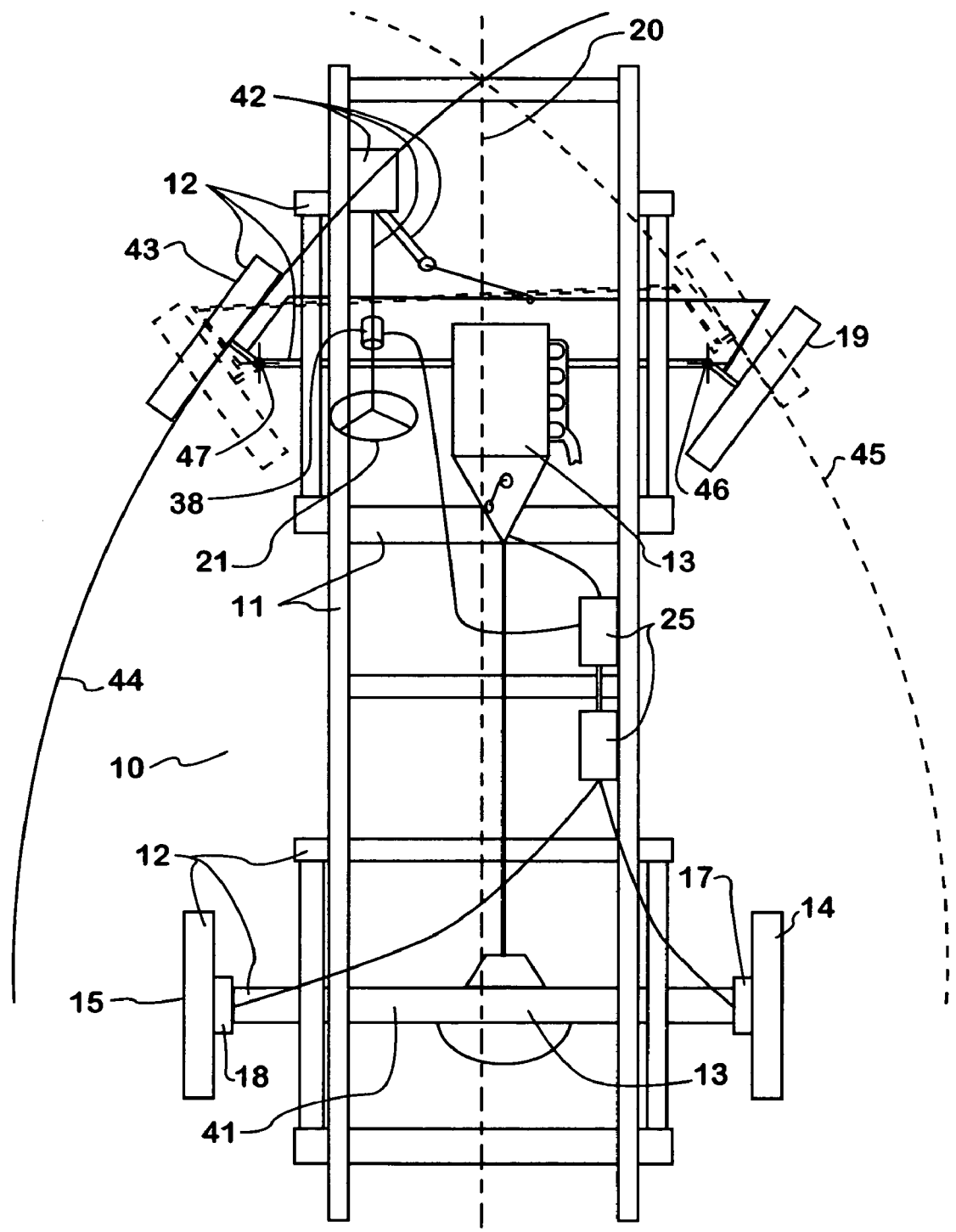
FIG. 1 is a plan view of a vehicle according to the present invention.

The present invention is a steering-enhancement system for a vehicle 10 and a vehicle 10 with such a steering enhancement system. FIG. 1 shows a vehicle 10 with which a steering-enhancement system according to the present invention may be advantageously utilized. The vehicle 10 shown in FIG. 1 includes a frame structure 11 to which a majority of other components of the vehicle 10 are directly or indirectly attached. The frame structure 11 may be a ladder frame such as is traditionally used in truck vehicles, a cage-like frame as is commonly used in racing vehicles, a unibody frame as is typically used in passenger cars, or any other type of structure that serves to support and locate the other systems of the vehicle 10. The vehicle 10 further includes a suspension system 12 that is engaged to and supports the frame structure 11 above the ground. The vehicle 10 also has a powertrain 13 for providing power to drive the vehicle 10 along the ground.

The suspension system of the vehicle 10 shown in FIG. 1 includes a first, right ground-engaging runner 19, and a second, left ground-engaging runner 15 that are spaced from one another in directions transverse to the longitudinal axis 20 of the vehicle 10. While the first, right ground-engaging runner 14 and the second, left ground-engaging runner 15 shown in FIG. 1 are wheels, other types of runners such as track assemblies may be employed. The vehicle 10 also comprises third and fourth ground-engaging runners 19, 43 that are steerable and disposed at a distance from the first, right ground-engaging runner 14 and the second, left ground-engaging runner 15 along the longitudinal axis 20 of the vehicle 10. While the third and fourth ground-engaging runners 19, 43 shown in FIG. 1 are wheels, other types such as skis may be employed. It should also be noted that the steering-enhancement logic of the present invention may also be advantageously utilized in vehicles that do not include the fourth ground-engaging runner 43 shown in FIG. 1.

In some embodiments, such as the one shown in FIG. 1, the first, right ground-engaging runner 14 and the second, left ground-engaging runner 15 are drivers through which the powertrain transmits power to the ground to propel the vehicle 10 there along. In such embodiments, the powertrain 13 is constructed and engaged to the first, right ground-engaging runner 14 and the second, left ground-engaging runner 15 in such a manner to simultaneously provide power to both the first, right ground-engaging runner 14 and the second, left ground-engaging runner 15, while allowing external forces to induce a speed differential between them. The powertrain 13 of the vehicle 10 shown in FIG. 1 includes an axle assembly 41 with independent axle shafts, each of which is connected at its outer end to one of the first and second ground engaging runners 14, 15 and at its inner end to a differential unit. It will be understood, however, that the steering enhancement system of the present invention can be utilized with vehicles having any construction allowing external forces to induce a speed differential between the first and second ground-engaging runners. In the vehicle 10 shown in FIG. 1, the first, right ground-engaging runner 14 and the second, left ground-engaging runner 15 are not steerable, which is to say that their angle with respect to the longitudinal axis 20 of the vehicle 10 is not adjustable. In many embodiments of the present invention, however, the first, right ground-engaging runner 14 and the second, left ground-engaging runner 15 will be steerable.

The vehicle 10 comprises a braking system with a right braking unit 17 and a left braking unit 18. When actuated, the right braking unit 17 resists movement of the first, right ground-engaging runner 14. When actuated, the left braking unit 18 resists movement of the second, left ground-engaging runner 15. A vehicle 10 according to the present invention further comprises one or more computers 25 that are capable of independently controlling whether and to what extent the right braking unit 17 is actuated and whether and to what extent the left braking unit 18 is actuated. The computers 25 are also capable of overriding any control exerted over the right braking unit 17 and the left braking unit 18 by manual controls such as a brake pedal. The braking system of the vehicle 10 may be constructed to provide actuation energy to the right braking unit 17 and the left braking unit 18 through any appropriate medium, including, but not limited to; 1) gases (such as air); 2) incompressible fluids (such as hydraulic fluid); 3) electricity; and 4) some combination of 1–3.

The third and fourth ground-engaging runners 19, 43 are steerable. The steerable ground-engaging runners 19, 43 are engaged to the rest of the suspension system 12 in such a manner that the steerable ground-engaging runners 19, 43 are pivotable about approximately vertical axes 46, 47. For purposes of this disclosure, the angle between the longitudinal axis 20 of the vehicle 10 and the steerable ground-engaging runners 19, 43 as viewed from above, is the steering angle of the steerable ground-engaging runners 19, 43. The steering angle of each of the steerable ground-engaging runners 19, 43 is infinitely adjustable within a predefined range of steering angles bounded by a rightmost steering angle (shown in solid lines in FIG. 1) and a leftmost steering angle (shown in dotted lines in FIG. 1). While FIG. 1 shows a vehicle 10 with two steerable ground-engaging runners 19, 43, a vehicle 10 according to the present invention need only have one steerable ground-engaging runner disposed at a distance from the first and second ground-engaging runners 14, 15 along the longitudinal axis 20 of the vehicle 10.

In some embodiments the third and fourth ground-engaging runners 19, 43 are also drivers through which the powertrain transmits power to the ground to propel the vehicle 10 there along. In many such embodiments, all of the vehicle's ground engaging runners, both steerable and non-steerable are drivers. Such an embodiment of vehicle is not shown in the drawings, but is well-known.

In some embodiments the vehicle 10 may include more ground engaging runners than the first, right ground-engaging runner 14, the second, left ground-engaging runner 15, the third ground-engaging runner 19, and the fourth ground-engaging runner 43. Each additional ground-engaging runner that a vehicle 10 according to the present invention may have could be steerable or non-steerable and could be a driver or non-driven.

The vehicle 10 further includes a steering system 42 that enables an operator to execute left and right turns of varying tightness by adjusting the steering angle of the steerable ground-engaging runners 19, 43. The steering system 42 includes a steering-control component 21 that an operator can manipulate to adjust the steering angle of the steerable ground-engaging runners 19, 43. The vehicle 10 shown in FIG. 1 has an ackerman type steering system 42 in which clockwise rotation of the steering wheel 21 causes pivoting of the steerable ground-engaging runners 19, 43 toward their rightmost steering angle and counterclockwise rotation of the steering wheel 21 causes pivoting of the steerable ground-engaging runners 19, 43 toward their leftmost steering angle. It will be understood, however, that the present invention may be advantageously utilized on a vehicle 10 with any type of steering system 42 that allows manipulation of a steering-control component 21 to adjust the steering angle of the steerable ground-engaging runners 19, 43 between their rightmost and leftmost steering angles.

The one or more computers 25 of the vehicle 10 monitor and control various aspects of the vehicle's operation. The one or more computers 25 monitor the speed of the vehicle 10. The one or more computers 25 may monitor the speed of the vehicle through sensors attached to the vehicle 10 or through signals generated by controllers on the vehicle 10.

The one or more computers 25 of the vehicle also directly or indirectly monitor the steering angle of the steerable ground-engaging runners 19, 43. The one or more computers 25 of the vehicle 10 could monitor the steering angle of the steerable ground-engaging runners 19, 43 through sensors mounted to the vehicle 10. With some types of steering systems, the one or more computers 25 could also monitor the steering angle of the steerable ground-engaging runners 19, 43 through signals generated by steering system controls. In constructions of steering systems 42 wherein there is a known relationship between the steering angle of a steerable ground-engaging runner 19, 43 and a second variable of the steering system 42, the one or more computers 25 of the vehicle 10 can indirectly monitor the steering angle by monitoring the second variable. For instance, in cases where the steering system 42 is an ackerman type steering system, such as the one shown in FIG. 1, the relationship between the angular position of the steering wheel 21 and the steering angle of the steerable ground-engaging runners 19, 43 is known. Accordingly, if the vehicle 10 includes a steering-wheel angle sensor 38 communicatively linked to the one or more computers 25, the one or more computers 25 can indirectly monitor the steering angle of the steerable ground-engaging runners 19, 43 by monitoring the angular position of the steering wheel 21.

In the absence of operation of the steering-enhancement system of the present invention, the tightest right turn the vehicle 10 can make is through the arc 44 shown in FIG. 1, which extends tangentially through the left steerable ground-engaging runner 43 at its rightmost steering angle. Likewise, in the absence of operation of the steering-enhancement system of the present invention, the tightest left turn the vehicle 10 can make is through the arc 45 shown in FIG. 1, which extends tangentially through the right steerable ground-engaging runner 19 at its leftmost steering angle.

The steering-enhancement system of the present invention automatically applies differential braking to provide tighter right and left turns than those represented by arcs 44 and 45. In order to effect a tighter right turn than that represented by arc 44, the one or more computers 25 effect right-biased differential braking. The one or more computers 25 do so by actuating the right braking unit 17 to such an extent that it exerts more braking effort on the first, right ground-engaging runner 14 than the left braking unit 18 exerts upon the second, left ground-engaging runner 15. As is well known, when the powertrain 13 is providing a driving force to motivate the vehicle 10, braking the first, right ground-engaging runner 14 to a greater extent than the second, left ground-engaging runner 15 creates a moment tending to turn the vehicle 10 to the right. If this moment is great enough, the steerable ground-engaging runners 19, 43 will "scrub" and the vehicle 10 will track inside arc 44. In order to effect a tighter left turn than that represented by arc 45 the one or more computers 25 effect left-biased differential braking.

The present invention includes steering-enhancement logic according to which the computers 25 of the vehicle 10 operate to determine whether to apply differential braking and, if so, what magnitude of differential braking to apply. A basic embodiment of steering-enhancement logic according to the present invention is represented by the flow chart of FIG. 2. At step 101, the one or more computers 25 first determine whether the steering-enhancement mode of operation is enabled. Not all embodiments of steering-enhancement logic according to the present invention will have provisions for disabling the steering-enhancement mode of operation, so not all embodiments will include step 101.

If the one or more computers 25 determine at step 101 that the steering-enhancement mode of operation is enabled, it is determined at step 102 whether the speed of the vehicle 10 is below a predetermined level. The steering-enhancement logic of the present invention only effects differential braking to enable tighter left and right turns when the speed of the vehicle is below a predetermined level, because it is at low speeds that an operator will generally have a need to make particularly tight left and right turns. The particular speed below which a vehicle 10 should be traveling before the steering-enhancement logic will effect differential-braking-assisted steering will vary dependant upon application and is readily determinable by a person of ordinary skill in the art. Additionally, the predetermined vehicle speed below which it is appropriate to activate differential braking to enhance steering may be defined, not in terms of a particular number of miles per hour, but as a function of operating parameters of the vehicle, such as gross vehicle weight, weight distribution, and service brake operational state.

If the one or more computers 25 determine at step 102 that the speed of the vehicle 10 is below the predetermined value, it is determined at step 103 whether the position of the steerable ground-engaging runners 19, 43 is within a predetermined range adjacent their rightmost steering angle.

For example, the steering-enhancement logic may require that the steerable ground-engaging runners 19, 43 be within 10 degrees of their rightmost steering angle before the one or more computers 25 will effect right-biased differential braking to increase the tightness of right turn that the vehicle 10 will make. If the one or more computers 25 determine at step 103 that the position of the steerable ground-engaging runners 19, 43 is within the predetermined range adjacent their rightmost steering angle, the one or more computers 25 proceed to step 104 and activate right-biased differential braking to enable a tighter right turn. The one or more computers 25 then return to step 101.

If the one or more computers 25 determine at step 103 that the position of the steerable ground-engaging runners 19, 43 is not within the predetermined range of positions adjacent their rightmost steering angle, the one or more computers 25 proceed to step 105. At step 105, the one or more computers 25 determine whether the position of the steerable ground-engaging runners 19, 43 is within a predetermined range adjacent their leftmost steering angle. For example, the steering-enhancement logic may require that the steerable ground-engaging runners 19, 43 be disposed within 10 degrees of their leftmost steering angle before the one or more computers 25 will activate left-biased differential braking to increase the tightness of left turn that the vehicle 10 will make. If the one or more computers 25 determine that the position of the steerable ground-engaging runners 19, 43 is within the predetermined range adjacent their leftmost steering angle, the one or more computers 25 proceed to step 106 and activate left-biased differential braking. The one or more computers 25 then return to step 101.

The appropriate size of the predetermined ranges of positions adjacent the rightmost and leftmost steering angles for which differential braking will be triggered will vary depending upon the application. The 10 degree ranges mentioned above are provided only to facilitate illustration of the steering-enhancement logic of the present invention to the reader; ranges of a different size than 10 degrees will likely be more appropriate for some applications. In fact, some applications may be best served by steering-enhancement logic that employs ranges that are defined, not as a fixed number of degrees, but as a function of operating parameters of the vehicle 10. For instance, the size of the ranges may be defined as a predetermined function of the speed and gross weight of the vehicle 10. With knowledge of the particular application in which the steering-enhancement logic of the present invention is to be utilized, a person of ordinary skill in the art can readily determine appropriate ranges of steering angles within which differential braking should be triggered to provide enhanced steering.

If the one or more computers 25 determine at step 101 that the steering-enhancement mode is not enabled; at step 102 that the vehicle's speed is not low enough; or at steps 103 and 105 that the position of the steerable ground-engaging runners 19, 43 is not within one of the predetermined ranges adjacent their rightmost and leftmost steering angles, the one or more computers 25 proceed to step 107. At step 107, the one or more computers 25 determine whether differential braking is active because of activation at steps 104 or 106. If so, the one or more computers 25 proceed to step 108, where they de-activate the differential braking.

Figure 2:
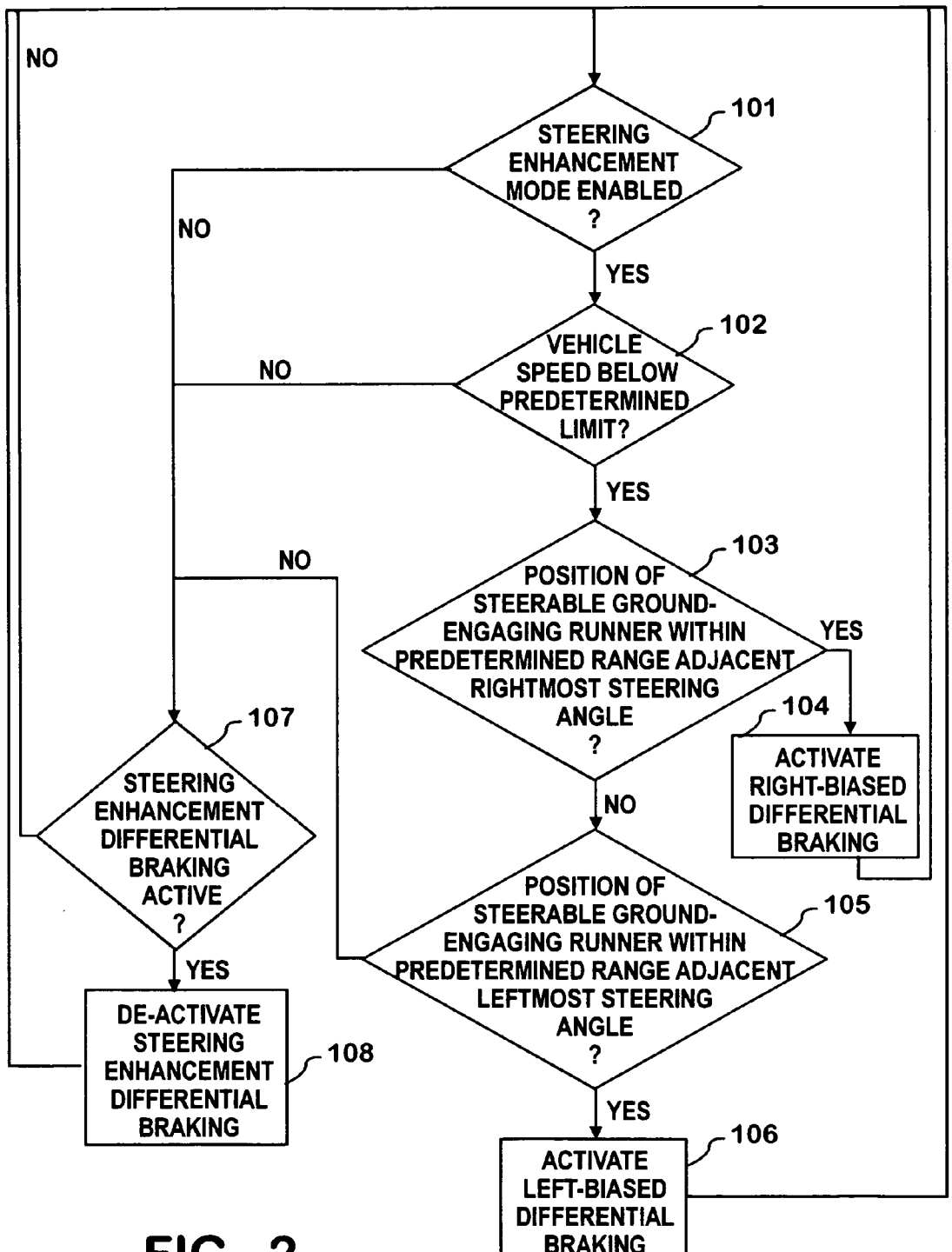
FIG. 2 is a flow chart illustrating the basic algorithm of the steering-enhancement logic of the present invention.

It should be understood that the flowchart of FIG. 2 and the discussion there about have been provided to facilitate understanding of the substantive requirements of steering-enhancement logic according to the present invention. The scope of the invention includes algorithms that are performed in a different sequence, but are substantively the same as that illustrated by FIG. 2 and described above.

Like the ranges of vehicle speed and steering angles for which differential braking is appropriate, the appropriate magnitude of differential braking to be effected in order to assist steering will depend largely upon the application.

In some applications of the present invention, the magnitude of differential braking will be controlled dependant at least partially upon the position of the steerable ground-engaging runners 19, 43 within the predefined ranges adjacent their rightmost and leftmost steering angles. In particular, in some applications the steering-enhancement logic will call for increasing the magnitude of differential braking as the position of the steerable ground-engaging runners 19, 43 approaches their leftmost or rightmost steering angles from within the predetermined steering angle ranges for which differential braking will be effected.

The differential braking characteristics of such an embodiment of steering enhancement logic are illustrated by FIG. 3, which is a simplistic, hypothetical look-up table for determining an appropriate magnitude of differential braking dependent upon steering angle. In the hypothetical embodiment represented by FIG. 3, "50" to the right is the rightmost steering angle of the steerable ground-engaging runners 19, 43. And "40"–"50" to the right is the predetermined range of steering angles that will trigger right-biased differential braking. FIG. 3 shows that, for the hypothetical embodiment represented thereby, when the steering angle is "40–42" to the right, the steering-enhancement logic will trigger right-biased differential braking with a magnitude of "1." If the steering angle were increased to "42–44" to the right, the steering-enhancement logic would increment the magnitude of the right-biased differential braking from "1" to "2." One can understand from viewing FIG. 3 that steering-enhancement logic wherein the magnitude of differential braking is greater the closer the steerable ground-engaging runners 19, 43 are to their rightmost or leftmost steering angle provides smooth, predictable onset of steering enhancement through differential braking. It will, of course, be understood that FIG. 3 is provided only to facilitate illustration of the basic principles of the steering-enhancement logic of the present invention and that the specific ranges and proportions therein are not necessarily preferred for any particular application.

In some embodiments of the present invention, the steering-enhancement logic will be configured to cause the one or more computers 25 to control the magnitude of differential braking dependent at least partially upon the direction and magnitude of steering effort exerted by an operator. For example, when right-biased differential braking is active and the operator is exerting effort to the right upon the steering-control component 21 of the vehicle 10, the steering-enhancement logic might call for increasing magnitude of the differential braking as the effort exerted upon the steering-control component 21 increases.

FIG. 4 illustrates a hypothetical look-up table that exemplifies such a dependence of the magnitude of differential braking on the direction and magnitude of effort exerted upon the steering-control component 21. FIG. 4 illustrates that, in the hypothetical embodiment represented thereby, if the steerable ground-engaging runners 19, 43 had a steering angle of "40–50" to the left and the operator were exerting an effort of "1" to the left upon the steering control component 21, the steering-enhancement logic would cause left-biased differential braking with a magnitude of "4." If the operator were to then increase the effort exerted upon the steering control component to "2" to the left, the steering-enhancement logic would cause the magnitude of the left-biased differential braking to be incremented to "5." Thus, FIG. 4 represents an example of an embodiment of steering-enhancement logic wherein, when the other conditions are appropriate to trigger left-biased differential braking and the direction of effort exerted upon the steering control 21 component is left, the magnitude of the left-biased differential braking is increased as the magnitude of the effort exerted upon the steering-control component 21 to the left increases. FIG. 4 also represents an example of an embodiment of steering-enhancement logic wherein when the other conditions are appropriate to trigger right-biased differential braking and the direction of effort exerted upon the steering control 21 component is right, the magnitude of the right-biased differential braking is increased as the magnitude of the effort exerted upon the steering-control component 21 to the right increases. It will, of course, be understood that FIG. 4 is provided only to facilitate illustration of the basic principles of the steering-enhancement logic of the present invention and that the specific ranges and proportions therein are not necessarily preferred for any particular application.

In order to enable control based upon the effort exerted upon the steering-control component 21, a vehicle 10 according to the present invention must have a sensor through which the one or more computers 25 can monitor the effort exerted upon the steering-control component 21. In the case of vehicles 10 such as the one illustrated in FIG. 1, the vehicle 10 may include a sensor for monitoring the torque applied to the steering wheel 21. Such sensors are disclosed in U.S. Pat. Nos. 6,782,967, 6,776,058, 6,725,734, 4,881,414, and 4,712,433, which are incorporated herein by reference. Of course, in such an embodiment, the one or more computers 25 are not actually monitoring whether the direction of effort applied to the steering wheel 21 is "left" or "right," but whether it is counterclockwise or clockwise. But effort applied to the steering wheel 21 in a counterclockwise direction corresponds to an intention of the operator to turn left. So, for purposes of this disclosure, counterclockwise application of torque to the steering wheel 21 is considered to be exertion of effort to the left upon the steering wheel 21. As a corollary, clockwise application of torque to the steering wheel 21 is deemed, for purposes of this disclosure, exertion of effort to the right upon the steering wheel 21. This convention of understanding a particular direction of application of effort to the steering-control component 21 to be "left" if it corresponds to an operator's intent to turn left and to be "right" if it corresponds to an operator's intent to turn right applies to all types of steering systems 42 and steering-control components 21. While an embodiment comprising a torque sensor for a steering wheel 21 has been described, a person of ordinary skill in the art could readily configure vehicles with other types of steering control components 21 with an appropriate sensor to allow the one or more computers 25 to monitor the direction and magnitude of effort exerted upon the steering-control component 21.

As was mentioned above, steering-enhancement logic according to the present invention may include provisions for disabling the steering-enhancement mode of operation, so that the one or more computers 25 of the vehicle 10 will not automatically activate differential braking to allow tighter turns. For vehicles 10 equipped with ABS braking systems, the steering-enhancement logic may be configured such that when an ABS event occurs, the steering-enhancement mode of operation is disabled until the ABS event is over. In some embodiments, the steering-enhancement logic will be configured such that the steering-enhancement mode of operation will be disabled when a fault condition is detected that relates to the signals that the one or more computers 25 rely on to execute the steering-enhancement logic. For example, if the one or more computers 25 detect a faulty steering-angle signal, the steering-enhancement logic could disable the steering-enhancement mode of operation. Additionally, steering-enhancement logic according to the present invention may be configured to enable an operator to disable the steering-enhancement mode of operation indefinitely, by transmitting a predetermined set of communications to the one or more computers 25 of the vehicle 10. As is well known, an operator could transmit such communications to the one or more computers 25 of the vehicle 10 using various controls of the vehicle 10 and/or service/diagnostics tools for the vehicle 10. Of course, a person of ordinary skill in the art could readily configure steering-enhancement logic according to the present invention to disable the steering-enhancement mode of operation for any of a number of other reasons appropriate for various applications of the present invention.

It should further be understood that other portions of the control logic for the one or more computers 25 of a vehicle 10 according to the present invention may cause differential braking when the steering-enhancement logic does not call for such differential braking. For example, the one or more computers 25 of a vehicle 10 according to the present invention may operate according to vehicle-stability logic in addition to the steering-enhancement logic of the present invention. In such a case, the vehicle-stability logic may call for differential braking when the steering-enhancement logic does not.

It should also be understood that the present invention may be implemented with any arrangement of one or more computers 25 that one desires. In recent years vehicle manufacturers have devised a myriad of ways to parse computer monitoring and control of the operation of various systems of a vehicle. The monitoring and control tasks of the steering-enhancement logic of the present invention may be concentrated on one computer or distributed among as many computers as one desires. Likewise, the computer program that embodies the steering-enhancement logic of the present invention may be stored on a single computer or it may be distributed upon as many networked computers as is desired.

It will also be understood that a steering enhancement system according to the present invention and a vehicle 10 utilizing it could take on any number of different forms within the guidelines set forth above and that some features of the invention could be employed without a corresponding use of other features.

We claim:

1. A vehicle, comprising:
   a frame structure to which a majority of other components of said vehicle are directly or indirectly attached;
   a suspension system that is engaged to said frame structure and supports said frame structure above the ground;
   a powertrain that provides motive power for driving said vehicle along the ground;
   wherein said suspension system comprises a first right ground-engaging runner and a second, left ground-engaging runner that are spaced from one another in directions transverse to a longitudinal axis of said vehicle;
   a braking system that comprises a right braking unit that when actuated, resists motion of said first, right ground-engaging runner;

wherein said braking system also comprises a left braking unit that, when actuated, resists motion of said second, left around-engaging driver;

wherein said suspension system further comprises a third, steerable ground-engaging runner that is spaced from said first and second ground-engaging runners along said longitudinal axis of said vehicle;

a steering system with a steering-control component that an operator can manipulate to adjust a steering angle of said steerable ground-engaging runner within a predefined range of steering angles bounded by a rightmost steering angle and a leftmost steering angle;

one or more computers that directly or indirectly monitor a position of said steerable ground-engaging runner within said predefined range of steering angles;

wherein said one or more computers also monitor said vehicle's speed;

wherein said vehicle also comprises one or more sensors through which said one or more computers also monitor a magnitude and direction of effort applied to said steering-control component by an operator;

wherein said one or more computers operate according to steering-enhancement logic that includes a steering-enhancement mode of operation wherein said steering-enhancement logic causes said one or more computers to perform the steps of:

if said vehicle's speed is below a predetermined level and said position of said steerable ground-engaging runner is within a predetermined range adjacent a rightmost steering angle, controlling said right braking unit to effect right-biased differential braking with a magnitude that is dependent at least partially on said magnitude and direction of effort applied to said steering-control component by an operator; and if said vehicle's speed is below said predetermined level and said position of said steerable ground-engaging runner is within a predetermined range adjacent a leftmost steering angle, controlling said left braking unit to effect left-biased differential braking with a magnitude that is dependent at least partially upon said magnitude and direction of effort applied to said steering-control component by an operator, said steering-enhancement logic is further configured such that when said vehicle's speed is below said predetermined level, said position of said steerable ground-engaging runner is within said predetermined range adjacent said rightmost steering angle, and said direction of steering effort applied to said steering-control component is right, said one or more computers effect right-biased differential braking with a magnitude that increases as said magnitude of said steering effort applied to said steering control-component to the right increases; and said steering-enhancement logic is further configured such that when said vehicle's speed is below said predetermined level, said position of said steerable ground-engaging runner is within said predetermined range adjacent said leftmost steering angle, and said direction of steering effort applied to said steering-control component is left, said one or more computers effect left-biased differential braking with a magnitude that increases as said magnitude of said steering effort applied to said steering control-component to the left increases, said steering-control component is a steering wheel; and said one or more sensors through which said one or more computers monitor said magnitude and direction of said effort applied to said steering wheel is a steering-wheel torque sensor, said steering-enhancement logic is configured such that said steering-enhancement mode of operation is disabled if said one or more computers detect a faulty signal related to said steering angle, said magnitude and direction of effort applied to said steering wheel, or said speed of said vehicle.

2. The vehicle of claim 1, wherein:
(a) said braking system is an anti-lock type braking system; and
(b) said steering-enhancement logic is configured such that said steering-enhancement mode of operation is disabled if said braking system goes into an ABS mode of operation.

3. The vehicle of claim 2, wherein:
(a) said steering-enhancement logic is configured such that if a user communicates a predetermined set of signals to said one or more computers, said steering-enhancement logic disables said steering-enhancement mode of operation.

4. A vehicle, comprising:
(a) a frame structure to which a majority of other components of said vehicle are directly or indirectly attached;
(b) a suspension system that is engaged to said frame structure and supports said frame structure above the ground;
(c) a powertrain that provides motive power for driving said vehicle along the ground;
(d) wherein said suspension system comprises a first, right ground-engaging driver and a second, left ground-engaging driver that are spaced from one another in directions transverse to a longitudinal axis of said vehicle;
(e) wherein said powertrain is constructed and engaged to said first, right ground-engaging runner and said second, left ground-engaging runner in such a manner to simultaneously transmit power to both while allowing external forces to induce a speed differential between said first, right ground-engaging driver and said second, left ground-engaging driver
(f) a braking system that comprises a right braking unit that, when actuated, resists motion of said first, right ground-engaging driver;
(g) wherein said braking system also comprises a left braking unit that, when actuated, resists motion of said second, left ground-engaging driver;
(h) wherein said suspension system further comprises at least one steerable ground-engaging runner that is spaced from said first right ground-engaging driver and said second, left ground-engaging driver along said longitudinal axis of said vehicle;
(i) a steering system with a steering-control component that an operator can manipulate to adjust a steering angle of said steerable ground-engaging runner within a predefined range of steering angles bounded by a rightmost steering angle and a leftmost steering angle;
(j) one or more computers that directly or indirectly monitor a position of said steerable ground-engaging runner within said predefined range of steering angles;
(k) wherein said one or more computers also monitor said vehicle's speed;

(j) wherein said one or more computers operate according to steering-enhancement logic that includes a steering-enhancement mode of operation wherein said steering-enhancement logic causes said one or more computers to perform the steps of:
  i. if said vehicle's speed is below a predetermined level and said position of said steerable ground-engaging runner is within a predetermined range adjacent a rightmost steering angle, affecting right-biased differential braking by actuating said right braking unit to exert greater braking effort upon said right ground-engaging driver than said left braking unit exerts upon said left ground-engaging driver, thereby allowing said vehicle to make a tighter right turn than would be possible solely through adjustment of said steerable ground-engaging runner to its rightmost steering angle; and
  ii. if said vehicle's speed is below said predetermined level and said position of said steerable ground-engaging runner is within a predetermined range adjacent a leftmost steering angle, affecting left-biased differential braking by actuating said left braking unit to exert greater braking effort upon said left ground-engaging driver than said right braking unit exerts upon said right ground-engaging driver, thereby allowing said vehicle to make a tighter left turn than would be possible solely through adjustment of said steerable ground-engaging runner to its leftmost steering angle.

5. The vehicle of claim 4, wherein:
(a) said first, right ground-engaging runner and said second, left ground-engaging runner are not steerable.

6. The vehicle of claim 4, wherein:
(a) said steering-enhancement logic is such that, when said one or more computers causes said right-biased differential braking, the magnitude thereof is dependant upon said position of said steerable ground-engaging runner relative to said rightmost steering angle, with said magnitude of said right-biased differential braking being greater the closer said position of said steerable ground-engaging runner is to said rightmost steering position;
(b) said steering-enhancement logic is such that, when said one or more computers causes said left-biased differential braking, the magnitude thereof is dependant upon said position of said steerable ground-engaging runner relative to said leftmost steering angle, with said magnitude of said left-biased differential braking being greater the closer said position of said steerable ground-engaging runner is to said leftmost steering position.

7. The vehicle of claim 6, wherein:
(a) said steering-control component is a steering wheel;
(b) said steering system is constructed such that each unique angular position of said steering wheel corresponds to a unique steering angle of said steerable ground-engaging runner;
(c) said vehicle comprises a steering-wheel angle sensor that senses the angle of said steering wheel and that is communicatively linked to said one or more computers; and
(d) said one or more computers indirectly monitor said position of said steerable ground-engaging runner by monitoring, through said steering-wheel angle sensor, an angular displacement of said steering wheel from its home position.

8. Steering enhancement software for a vehicle, which vehicle comprises a first, right ground-engaging runner and a second, left ground-engaging runner that are spaced from one another in directions transverse to a longitudinal axis of the vehicle; a braking system that comprises a right braking unit that, when actuated, resists motion of the first, right ground-engaging runner wherein the braking system also comprises a left braking unit that, when actuated, resists motion of the second, left around-engaging runner; at least one steerable ground-engaging runner that is spaced from the first, right ground-engaging runner and the second, left ground-engaging runner along the longitudinal axis of the vehicles steering system with a steering-control component that is movable within a predefined range of controller positions to adjust a steering angle of said steerable ground-engaging runner within a predefined range of steering angles that corresponds to said predefined range of controller positions; one or more computers that are operable to control operation of the right braking unit and the left braking unit; and one or more sensors through which the one or more computers monitor a magnitude and direction of effort applied to the steering-control component by an operator, wherein said steering-enhancement software comprises;
  a computer program that is embodied in computer readable medium for loading into computer memory of the one or more computers of the vehicle;
  wherein said computer program comprises steering-enhancement logic that includes a steering-enhancement mode of operation in which the one or more computers of the vehicle are caused to perform the steps of:
    if the vehicle's speed is below a predetermined level and the position of the steerable ground-engaging runner is within a predetermined range adjacent a rightmost steering angle, controlling the right braking unit to effect right-biased differential braking with a magnitude that is dependent at least partially upon the magnitude and direction of effort applied to said steering-control component by an operator; and
    if the vehicle's speed is below said redetermined level and the positron of the steerable ground-engaging runner is within a predetermined range adjacent a leftmost steering angle, controlling the left braking unit to effect left-biased differential braking with a magnitude that is dependent at least partially upon the magnitude and direction of effort applied to the steering-control component by an operator,
  said steering-enhancement logic is further configured such that when the vehicle's speed is below said predetermined level, the position of the steerable ground-engaging runner is within said predetermined range adjacent the rightmost steering angle, and the direction of steering effort applied to said steering-control component is right, the one or more computers effect right-biased differential braking with a magnitude that increases as the magnitude of the steering effort applied to the steering control-component to the right increases; and
  said steering-enhancement logic is further configured such that when the vehicle's speed is below said redetermined level the position of the steerable ground-engaging runner is within said predetermined range adjacent the leftmost steering angle, and the direction of steering effort applied to the steering control-component is left, the one or more computers effect left-biased differential braking with a magnitude that increases as the magnitude of the steering effort applied to the steering control-component to the left increases.
  said steering-enhancement logic is configured such that said steering-enhancement mode of operation is disabled if the one or more computers detect a faulty signal related to the steering angle, the magnitude and direction of effort applied to the steering wheel, or the speed of the vehicle.

9. The steering-enhancement software of claim 8, wherein:
(a) said steering-enhancement logic is configured such that said steering-enhancement mode of operation is disabled if the braking system goes into an ABS mode of operation.

10. The steering-enhancement software of claim 9, wherein:
(a) said steering-enhancement logic is configured such that if a user communicates a predetermined set of signals to the one or more computers, said steering-enhancement logic disables said steering-enhancement mode of operation.

* * * * *